United States Patent
Kumar et al.

(10) Patent No.: US 11,988,573 B1
(45) Date of Patent: May 21, 2024

(54) METHOD FOR DETERMINING A LOCATION TO PLACE A MASS ON A WHEEL ASSEMBLY

(71) Applicant: NVH Technology LLC, Coatesville, PA (US)

(72) Inventors: Rishi Kumar, Downingtown, PA (US); Saptak Das, Downingtown, PA (US); Raj Methi, Paoli, PA (US); Elijah Daniel Wright, West Chester, PA (US); Eric L. Canfield, Downingtown, PA (US); Robert P. Alston, Exton, PA (US); David A. Fenimore, Coatesville, PA (US); Stephen T. Buchanan, Landenberg, PA (US)

(73) Assignee: NVH TECHNOLOGY LLC, Coatesville, PA (US)

( * ) Notice: Subject to any disclaimer, the term of this patent is extended or adjusted under 35 U.S.C. 154(b) by 0 days.

(21) Appl. No.: 18/400,534

(22) Filed: Dec. 29, 2023

Related U.S. Application Data

(60) Provisional application No. 63/603,221, filed on Nov. 28, 2023.

(51) Int. Cl.
*G01M 1/28* (2006.01)

(52) U.S. Cl.
CPC .................................... *G01M 1/28* (2013.01)

(58) Field of Classification Search
None
See application file for complete search history.

(56) References Cited

U.S. PATENT DOCUMENTS

RE31,971 E    8/1985  Gold
6,278,361 B1  8/2001  Magiawala et al.
(Continued)

FOREIGN PATENT DOCUMENTS

EP    3637078 A1    4/2020

OTHER PUBLICATIONS

Product brochure for PicoDiagnostics NVH kits, Noise, Vibration and Balancing, downloaded from web page: < https://www.picoauto.com/products/noise-vibration-and-balancing/nvh-overview>, download date: Dec. 29, 2023, original posting date: unknown, 5 pages.

*Primary Examiner* — Kristina M Deherrera
*Assistant Examiner* — Mark A Shabman
(74) *Attorney, Agent, or Firm* — Panitch Schwarze Belisario & Nadel LLP

(57) ABSTRACT

A method is provided for determining a location to place a mass on a wheel assembly. A first set of acceleration data is collected from a plurality of inertial measurement units (IMU's) that are mounted to a removably attachable object that is attached to a wheel of the vehicle in a manner that inhibits the object from coming off of the vehicle when the vehicle is in motion. The first set of acceleration data is collected while operating the vehicle at a first speed. The first set of acceleration data is used to determine an offset between a center of the object and a bearing center of the wheel assembly. A second set of acceleration data is collected from the plurality of inertial measurement units (IMU's). The second set of acceleration data is collected while operating the vehicle at second speed that is greater than the first speed. The second set of acceleration data and the offset determined from the first set of acceleration data is used to determine the location to place the mass on a wheel assembly with respect to the bearing center of the wheel assembly.

4 Claims, 18 Drawing Sheets

(56) References Cited

U.S. PATENT DOCUMENTS

| | | |
|---|---|---|
| 6,595,053 B2 | 7/2003 | Parker |
| 9,463,674 B1 | 10/2016 | He et al. |
| 9,785,610 B1 | 10/2017 | Larson et al. |
| 10,284,752 B1 | 5/2019 | Canfield et al. |
| 10,969,292 B2 | 4/2021 | Canfield et al. |
| 11,287,348 B2 | 3/2022 | Canfield et al. |
| 11,480,491 B1 | 10/2022 | Canfield et al. |
| 11,534,915 B1 | 12/2022 | Alspaugh et al. |
| 11,731,673 B1 | 8/2023 | Buchanan et al. |
| 2009/0139327 A1 | 6/2009 | Dagh et al. |
| 2010/0288030 A1 | 11/2010 | Shin et al. |
| 2017/0248488 A1* | 8/2017 | Chevrier .............. G01M 1/326 |
| 2017/0313329 A1 | 11/2017 | Peltz |
| 2017/0350684 A1* | 12/2017 | Maliszewski .......... G01B 5/255 |
| 2018/0082492 A1* | 3/2018 | Stanek ................ G07C 5/0808 |
| 2021/0063267 A1* | 3/2021 | Canfield ............. G01M 17/022 |
| 2021/0181063 A1 | 6/2021 | Dodani et al. |
| 2021/0256782 A1 | 8/2021 | Ehlers |
| 2023/0417617 A1 | 12/2023 | Chalofsky et al. |

* cited by examiner

DATA PROCESSING

ORDER ANALYSIS/CORRECTIVE MASS DETERMINATION

METHOD FOR DETERMINING A LOCATION TO PLACE A MASS ON A WHEEL ASSEMBLY

CROSS-REFERENCE TO RELATED APPLICATIONS

This application claims priority to U.S. Provisional Patent Application No. 63/603,221 filed Nov. 28, 2023, which is incorporated by reference herein.

This application is related to the following concurrently filed U.S. Non-Provisional Patent Applications:
1. U.S. application Ser. No. 18/400,543 filed Dec. 29, 2023 entitled "Method for determining a magnitude of a mass to be placed on a wheel assembly using acceleration data."
2. U.S. application Ser. No. 18/400,546 filed Dec. 29, 2023 entitled "Method for detecting vibrational anomalies of a vehicle using a plurality of devices that are removably attachable to the vehicle."

BACKGROUND OF THE INVENTION

"Vibrational anomalies of a vehicle" refers to any repetitive motion of a vehicle or component or assembly of a vehicle that could cause either a quality-of-ride issue or wear on a part of the vehicle. Vibrational anomalies can be caused by a variety of issues such as, but not limited to, engine issues, drivetrain issues, chassis or wheel issues, including tire balancing issues. Some of the most commonly occurring vibrational anomalies are present in vehicle tires and wheel assemblies. "Tire balance" refers to the distribution of mass within a vehicle tire or the entire wheel assembly, including the rim, on which the vehicle tire is mounted. Tire balance may also be referred to as "tire unbalance" or "tire imbalance." As described in U.S. Pat. No. 6,595,053 (Parker), which is incorporated by reference herein, the balancing of vehicle wheel assemblies is most often accomplished by removing the tire/wheel assemblies from the vehicle and mounting each of the assemblies on an off-car-balancer. One example of an off-car balancer is The Road Force® Elite wheel balancer, which is commercially available from Hunter Engineering Company, Bridgeton, Missouri. The off-car balancer rotates the tire/wheel assembly, measures the imbalance forces, and displays the amount and location of weight to add to the wheel to bring the tire/wheel assembly into a balanced condition. Most off-car balancers spin the wheel at a relatively low and fixed speed or RPS (the equivalent of 30 mph). But many vibrational anomalies, such as tire eccentricity, only occur at high speeds. Off-car balancers will not detect most anomalies induced by high speeds, a change in vehicle weight which changes the applied road force, or anomalies caused by other systems of the vehicle.

As also described in U.S. Pat. No. 6,595,053, a tire/wheel assembly may be balanced so that it produces negligible forces when rotated on the off-car balancer, but the same assembly may cause significant imbalance forces when mounted on the vehicle and rotated using the vehicle's bearings and axle. The imbalance forces of a tire/wheel assembly will remain constant between the off-car balancer and vehicle or truck, only if the relationship between the tire wheel assembly and the axis of rotation is the same for the two mountings. Achieving the desired on-car wheel balance with only an off-car balancer involves both accurately mounting the wheel on the balancer and then accurately mounting the tire/wheel assembly on the vehicle's hub.

Along with the previously mentioned inability to detect high-speed vibrational anomalies, there are additional limitations to off-car balancers.

As described in U.S. Pat. No. 6,595,053 and further described in U.S. Pat. No. 11,480,491 (Canfield et al.), on-car balancers can both help eliminate the mounting accuracy problems as well as operate at the high speeds of the vehicles. Although on-car balancers are available, they are not very popular because of setup difficulties, operational limitations, and safety issues. There are two aspects of on-car balancing. First, data must be collected. Second, the data must be analyzed to determine what, if any, action needs to be taken to correct any detected imbalance forces. Another possibility with on-car balancers is the addition of other types of vehicles that are not supported by off-car balancers, such as railcars which have railcar wheels that also experience imbalance forces.

SUMMARY OF THE PRESENT INVENTION

In one preferred embodiment, a method is disclosed for determining vibrational anomalies of a vehicle using a removably affixed on-car device. A sensor module is removably attached to one or more wheels of the vehicle in a manner that inhibits the objects from detaching when the vehicle is in operation. In another preferred embodiment, multiple sensors are removably attached to multiple locations of the vehicle, for example the body and wheel, in a manner that inhibits the objects from detaching when the vehicle is in operation. Each of the one or more sensors include one or more IMU's mounted to the vehicle and configured to measure parameters that are used for calculating the vibrational anomalies when the vehicle is in operation. Motion data is captured by one or more IMU's and is collected. The collected motion data is processed to determine the presence of one or more vibrational anomalies of the vehicle. A recommended corrective action to be taken is determined when the result of the processed data indicates the presence of one or more vibrational anomalies of the vehicle. All of the preferred embodiments may also be enhanced using an OBD-type of interface, wired or wireless based communications, and other motion and vibration measurement devices, such as cameras and the like.

BRIEF DESCRIPTION OF THE DRAWINGS

Preferred embodiments of the present invention will now be described by way of example with reference to the accompanying drawings.

DETAILED DESCRIPTION OF THE INVENTION

Certain terminology is used herein for convenience only and is not to be taken as a limitation on the present invention. The words "a" and "an", as used in the claims and in the corresponding portions of the specification, mean "at least one."

The discussion below is a continuation of the discussion on "vibrations" as presented in U.S. Pat. Nos. 11,480,491 and 11,287,348. U.S. Pat. Nos. 11,480,491 and 11,287,348 (Canfield et al.), which are incorporated by reference herein, refers to "vibrations" and "translational vibrations." Some vibrations are the result of translational forces, whereas other vibrations are not the result of translational forces. One type of translational vibration is "imbalance forces" which can be caused by an imbalanced rotating mass. The present invention determines the presence of one or more "vibrational anomalies." In one embodiment, the vibrational anomaly or anomalies are those of a vehicle. In another embodiment, the vibrational anomaly or anomalies are specific to that of a tire/hub/wheel assembly.

U.S. Pat. No. 11,480,491, and the discussion below, also refer to a vehicle being "in operation." For a passenger vehicle or truck (e.g., a motor vehicle, an electric vehicle (EV)), "in operation" includes having the vehicle in motion or having the vehicle's engine on (in the case of a motor vehicle), but not necessarily having the vehicle in motion. For other types of vehicles, such as railcars, being "in operation" requires having the vehicle in motion.

U.S. Pat. No. 11,480,491, and the various embodiments described below, each make use of either one or a plurality of Inertial Measurement Units (hereafter IMU's). Any IMU may be used that has a form factor and durability suitable for the environment described herein. One suitable IMU is the IMU described in U.S. Pat. No. 10,284,752 (Canfield et al.), which is incorporated herein by reference. Sample measured data, which are used for calculating the imbalance forces during motion of the vehicle, are captured by one or a plurality of IMU's. These data include, but are not limited to, linear acceleration and angular velocity.

One preferred embodiment of the present invention determines a corrective action which can be taken for several different types of vibrational anomalies of a vehicle. The process for such a determination utilizes an object removably attached to the vehicle, such as any of the apparatuses shown in U.S. Pat. No. 10,969,292 (Canfield et al.) and U.S. Pat. No. 11,480,491, both of which are incorporated by reference herein. Other objects and attachment mechanisms are within the scope of the present invention. The object is also interchangeably referred to herein as "device" or "measurement device."

Figure 1A:
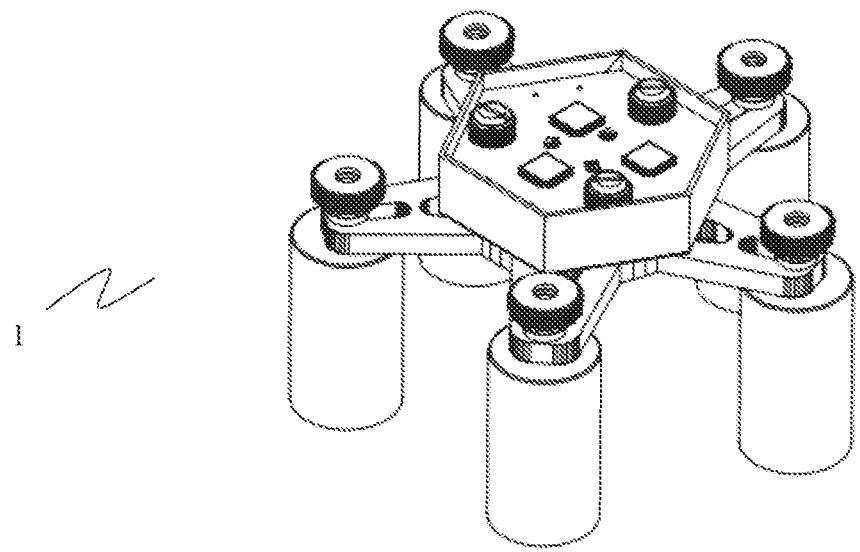
FIG. 1A is one embodiment of the on-car device which is removably attached to the vehicle-under-test.

One preferred embodiment of the device 1 shown in FIG. 1A includes one or more IMU's which are used to collect motion data of the vehicle. The device 1 is one preferred embodiment that can be attached to a vehicle's lug nuts through mounting cups 12, shown in FIG. 1B, but with the removal of the mounting cups 12 and their respective platen 11, the module 10 can be mounted at any location on the vehicle to analyze any kind or combination of vibrational anomalies. One preferred embodiment has one or more devices mounted to the lug nuts of a wheel/hub assembly as well as additional locations (as presented in FIG. 2). This mounting location allows for the device to measure and identify the vibrational anomalies that may arise from the wheel/hub assembly, such as those from imbalance, eccentricity, or radial road force, or any form of mass distribution or imbalance related vibrations (or vibrational anomalies). One preferred embodiment of a process for collecting motion data of the wheel is described by the following Data Collection Process:

1) Locate a section of road that allows the vehicle to attain and maintain a consistent speed for a desired Data Collection Interval, such as 15 seconds, and then attain and maintain a consistent testing speed, either a Low-Speed or High-Speed test. One example of a Low-Speed and High-Speed is used in the referenced embodiment with the Low-Speed being maintained at 30 MPH and the High-Speed being maintained at 60 MPH. In preferred embodiments of the present invention, High-Speed (interchangeably referred to herein as the "second speed) is between 1.5 and 3.0 times the Low-Speed (interchangeably referred herein as the "first speed."), although other ratios are within the scope of the present invention.

2) Prepare the Measurement Device with trial parameters. These parameters include, but are not limited to, sensor sensitivity and filter specifications.

3) Affix the device or devices to the wheel lug nuts. It should be noted that the number of wheel lug-mounted devices is only limited to the number of wheels on a given vehicle.
4) Drive the vehicle to the testing site.
5) Attain Low-Speed and set cruise control, if possible, to maintain a consistent speed.
6) Start collecting Low-Speed data. Initiating data collection can be done in a variety of different ways. Three such ways are listed below.
   a. Automatically using an algorithm wherein device 1 detects the consistent speed of the vehicle and begins collecting data for a predetermined time interval or until the vehicle speed is no longer consistently within the preferred data collection speed parameters.
   b. Manually controlling the data collection via any type of remote control.
   c. Automatically controlling the data collection via an OBD-type reader configured to use vehicle data in order to remotely control the device 1 or devices.
7) Maintain Low-Speed for the prescribed Data Collection Interval.
8) Stop collecting Low-Speed data and store the dataset.
9) Accelerate to High-Speed and set cruise control, if possible, to maintain a consistent speed.
10) Start collecting High-Speed data.
11) Maintain High-Speed for the prescribed Data Collection Interval.
12) Stop collecting High-Speed data and store the dataset.
13) Once the prescribed data has been collected, one or more example methods for processing may be executed:
   a. The Low-Speed and High-Speed data can be exported by any means for analysis.
   b. The device 1 internally executes the analysis algorithms which are further detailed in this specification and communicates the results by any optical, tethered, wired, or remote control means.

The data can now be used to determine the corrective measures needed. One preferred embodiment of such a process is shown by the flowchart in FIG. 3 in blocks 20, 21, 22, and 23. The steps and outcomes of the flowchart are as follows: Find the best Low-Speed section using the Heuristic. Heuristic refers to an algorithm that chooses a section of data based upon set criteria. These criteria determine the hierarchy of the characteristics considered in the decision-making process. The Heuristic is shown in FIG. 4, continues to FIG. 5, and is concluded in FIG. 6.

Figure 7:
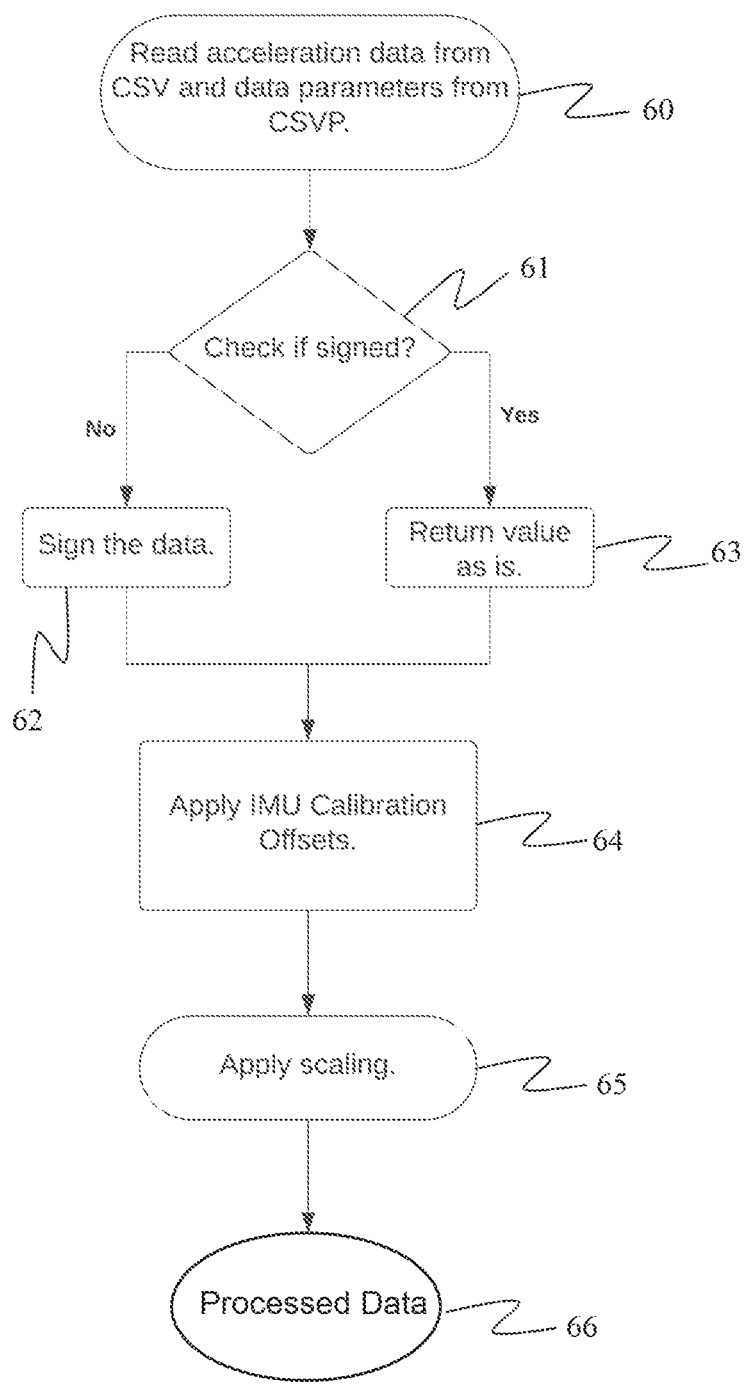
FIG. 7 is a Data Processing flowchart which converts the data received from the module and processes it from an unsigned bitcount to a signed, scaled, and calibrated format.

The first step of the Heuristic is to determine the Heuristic Factors needed to calculate the Heuristic Internal. There can be an unlimited number of Heuristic Factors, but in this example embodiment, only four Heuristic Factors have been identified. One preferred embodiment for the determination of the Heuristic Factors is shown in FIG. 4. The steps and outcomes of the flowchart are as follows:

Block 30: Get Processed Data. The data must be processed from its raw bitcount format into calibrated, signed, and scaled data. This process is visualized in FIG. 7 in blocks 60, 61, 62, 63, 64, 65, and 66. The steps and outcomes of the flowchart are as follows:

Block 60: Read acceleration data from CSV file and data parameters from CSVP (CSVP refers to a CSV file that contains the data Parameters). The CSV file includes, but is not limited to, acceleration, gyroscopic, and magnetometer data for all three axes (x, y, and z) of each sensor as a bitcount. The bitcount can be 8, 16, 20, 24, or 32 bits in length, depending on the data export and file formats. The present invention primarily makes use of the acceleration data in this disclosure, while the gyroscopic and magnetometer data are used in related functions, data collection, and analysis which include, but are not limited to, lateral runout, alignment, etc. The CSVP data parameters include information such as IMU Calibration Offsets (used for range correction) and sensor sensitivity, which is determined by the maximum possible samples. Preset possible sensitivities include, but are not limited to, +/−2G, +/−4G, +/−8G, and +/−16G, each of which, divided by 65,536 or the maximum bitcount of the IMU used, results in a different corresponding bitcount per G. For instance, a +/−2G range yields a resolution of 16,384 bits per G, while a +/−16G range yields a resolution of 2,048 bits per G.

Blocks 61, 62, and 63: The unsigned data from the CSV files are first converted to signed data.

Block 64: Apply IMU Calibration Offsets. The IMU Calibration Offsets correct the sensor's bitcount range to account for imperfections in the sensor data. This is accomplished by collecting data with the device placed on a level surface so that the sensor is vertically aligned with gravity. In this orientation the sensor will give a reading that corresponds to the value of gravity (1G or 9.8 m/s$^2$). The data is also collected with the sensor vertically aligned opposite gravity. In this orientation the sensor will give a reading that corresponds to the negative value of gravity (−1G or −9.8 m/s$^2$). If the sensitivity is set at 16G then these two bitcount values would theoretically equal 2048 and −2048 after the unsigned data is converted to signed data. For both electronic and physical reasons those readings can differ from the expected values. The measured readings are referred to as the IMU Calibration Offsets. For example, the value that corresponds to 9.8 m/s$^2$ could be 2050 bitcount and the value that corresponds to −9.8 m/s$^2$ could be −2044 bitcount. It can be seen that the range has increased from its expected value. By subtracting the average of these two values $$\left(\frac{2051 + (-2045)}{2} = 3\right)$$

to the signed area, it will correct the range of the collected and now signed data such that a reading of 2048 bitcount will correspond to 9.8 m/s$^2$ and a reading of −2048 bitcount will correspond to −9.8 m/s$^2$.

Block 65: Apply Scaling. Scaling will stretch or compress the span of the data that exists between 9.8 m/s$^2$ and −9.8 m/s$^2$ so that the data values correspond with the selected sensitivity. For a sensitivity of 16G, the mathematical span between the reading for +9.8 m/s$^2$ and the reading for −9.8 m/s$^2$ should be 4096 bitcount. In an example where the bitcount measurement for +9.8 m/s$^2$ is 2050 and the bitcount measurement for −9.8 m/s$^2$ is −2044, the span would be equal to 4094 bitcount. As the span is not equal to the mathematical span of 16G, that means that the data is compressed and needs to be uncompressed by a factor of $$\frac{4096}{4094} = 1.0004885.$$

Each data point is multiplied by this scaling factor to correct for this compression. Conversely, if the original data was stretched, the scaling factor would be less than one to compress the data. All of the CSV unsigned data has now been signed, the calibrations applied, and the data scaled, if necessary.

Block 66: Processed Data. The outcome after all calculations have been processed.

Block 31: Get the acceleration for each of Sensors in the device.

Figure 8:
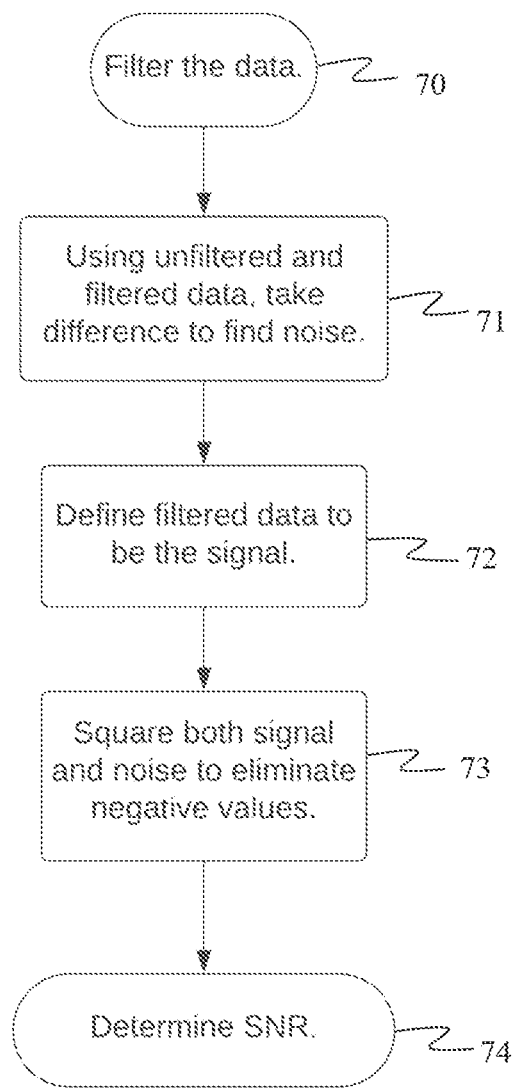
FIG. 8 is a flowchart of the process followed when determining the signal-to-noise ratio (SNR).

Block 33: Calculate the SNR for each dataset. One embodiment of this process is shown in the flowchart in FIG. 8. The steps and outcomes are as follows:

Block 70: Filter the data. A filter, such as a Savitsky-Golay or Gaussian filter, is applied to mitigate or eliminate noise so the RPM is clearer than other vibrations.

Block 71: Using unfiltered and filtered data, take the difference to find noise.

Block 72: Define the filtered data to be the signal.

Block 73: Square both the signal and the noise to eliminate negative values.

Block 74: Determine the SNR. The SNR is the ratio of the squared signal and noise. It is calculated for each sample.

Block 34: Calculate the average of the three sensor SNRs for each sample shown as Output 1 in FIG. 4.

Figure 9:
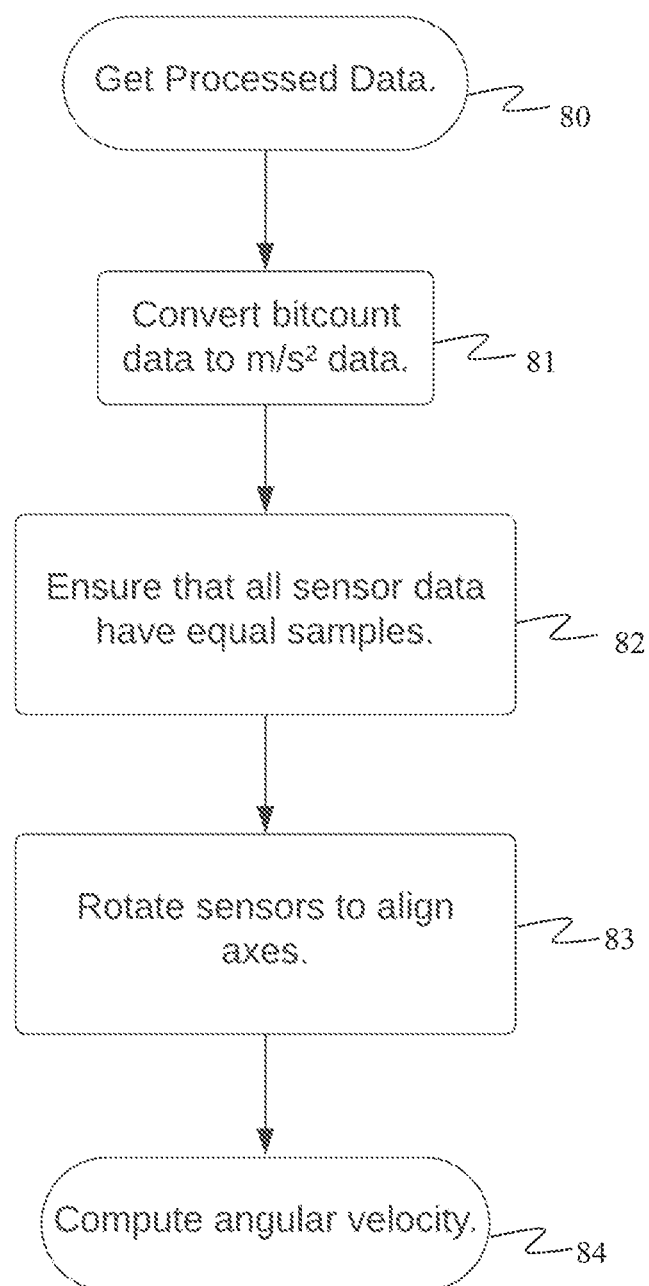
FIG. 9 is a flowchart that demonstrates the process used to derive the angular velocity of the wheel from the sensor data.

Block 35: Derive the angular velocity. The exact angular velocity, or RPM, of the wheel is required to understand the wheel dynamics and vibrations. While there are many ways to collect the angular velocity data of a vehicle in motion, such as taking data from an OBD reader, one preferred embodiment utilizes the multiple IMU data to derive the exact angular velocity of the wheel, as other methods may have inaccuracies. One preferred embodiment for this process is shown in the flowchart in FIG. 9. The steps and outcomes of the flowchart are as follows:

Block 80: Get Processed Data. One preferred embodiment for retrieving Processed Data 66, which is described above, is shown in FIG. 7. The result is calibrated and signed bitcount.

Block 81: Convert bitcount data to m/s² data. All data is multiplied by a G conversion factor that is determined by the sensitivity setting found in the CSVP data.

Block 82: Ensure that all sensor data have an equal number of samples for each axis. Some methods for ensuring equality would be to resample or truncate the data. The sensor with the lowest number of samples will determine the number of samples for all sensors. The datasets for the other sensors will be corrected to match the lower sample rate. In the preferred embodiment, the sensor sample rates are precisely synchronized, and no extra equalization of the individual axes datasets is necessary.

Figure 10:
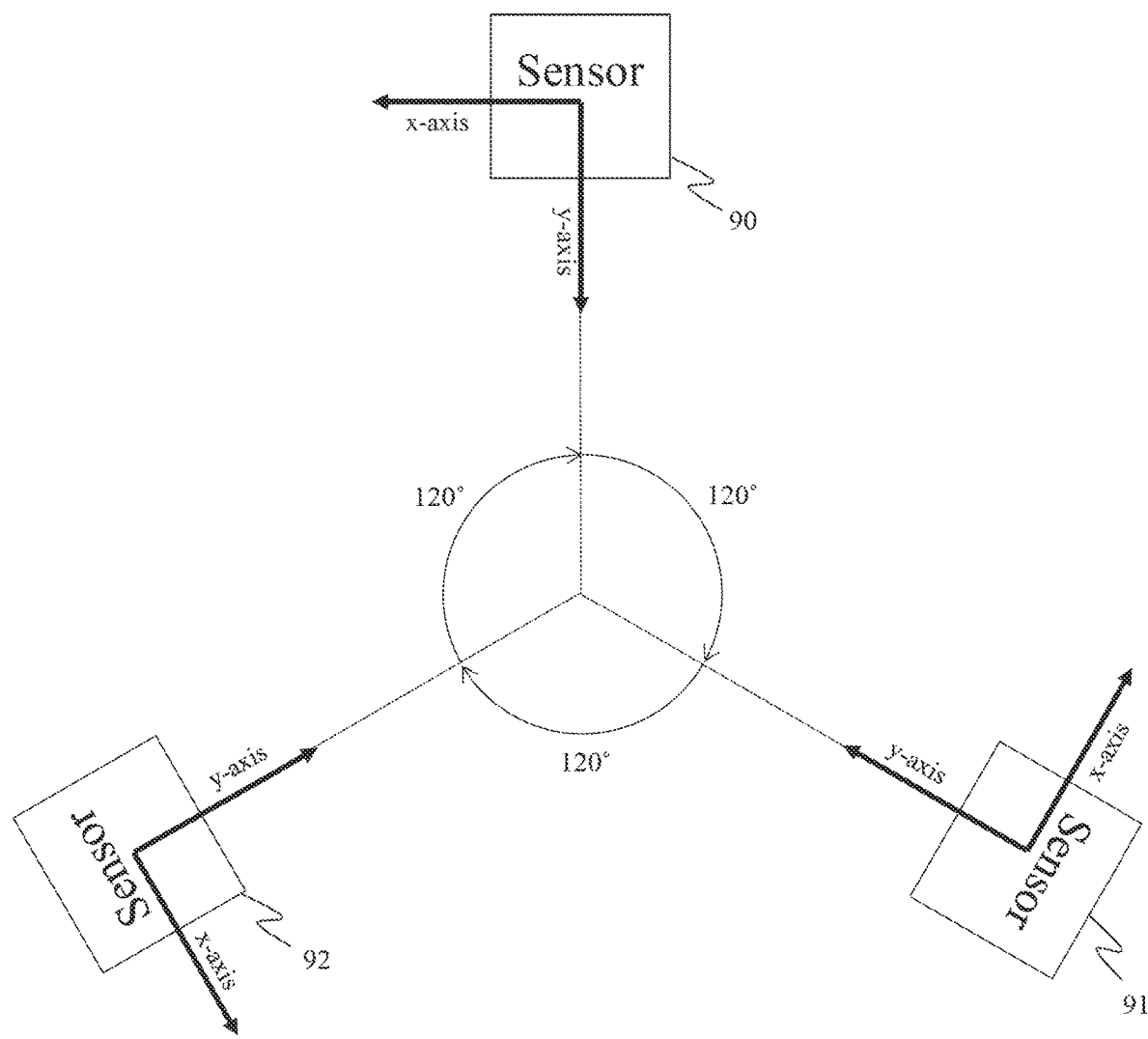
FIG. 10 shows one preferred embodiment's orientation of the axes for each sensor in the on-car device.

Block 83: Rotate sensors to align axes. In one preferred embodiment containing three sensors as shown in FIG. 10, Sensors 90, 91, and 92 represent three IMU's which are oriented in device 1 such that they are precisely equidistant from the center of the module, 120° offset from each other and have their y-axes all pointing toward the center. The alignment of the axes that is referred to in Block 83 converts the data such that all sensors have the same orientation as Sensor 90, where the y-axis is pointing down and the x-axis is pointing to the left. This alignment is required to compute the angular velocity.

Block 84: Compute the angular velocity. Using $$\omega = \sqrt{\frac{x_2 - x_3}{R\sqrt{3}}},$$

the angular velocity is determined in rad/s. This equation was derived from Kionix®, as described in a Kionix paper entitled "Using Two Tri-axis Accelerometers for Rotational Measurements." Jan. 10, 2008 (Document AN 019), 8 pages. In the angular velocity equation, the following is a listing of what each variable represents:
ω=angular velocity in rad/s
$x_2$=x-acceleration of Sensor 91
$x_3$=x-acceleration of Sensor 92
R=distance from each sensor to center of the platen
The computed angular velocity is the Derived RPM, shown as Output 2 in FIG. 4.

Block 36: Calculate the RPM SNR for each sample. One embodiment of this process is shown in the flowchart in FIG. 8 and has been described above. This results in a sample-by-sample SNR shown as Output 3 in FIG. 4.

Block 37: Smooth the angular velocity signal. In one preferred embodiment the signal is smoothed using a heavy moving average. With data collected at 2000 samples per second an example of a heavy moving average window would be 2000. The angular velocity can also be used to best determine the value of any applied filter or moving average.

Block 38: Derive the angular acceleration. In one preferred embodiment, the derivative of the angular velocity is used to find the angular acceleration.

Block 39: Square the angular acceleration signal. A constant speed is desired to simplify calculations. Therefore, acceleration is undesirable whether it is positive or negative. Thus, any data that shows an acceleration should be penalized. In order to penalize any and all acceleration the angular acceleration is squared, which can be used to determine the magnitude of angular acceleration. This determines the Squared Angular Acceleration Heuristic Factor shown as Output 4 in FIG. 4.

At this point the following Heuristic Factors have been determined:
1. The Average Sensor SNR of all sensors associated with each data point is shown as Output 1 in FIG. 4.
2. The RPM associated with each data point is shown as Output 2 in FIG. 4.
3. The RPM SNR associated with each data point is shown as Output 3 in FIG. 4.
4. The Squared Angular Acceleration associated with each data point which is shown as Output 4 in FIG. 4.

Figure 5:
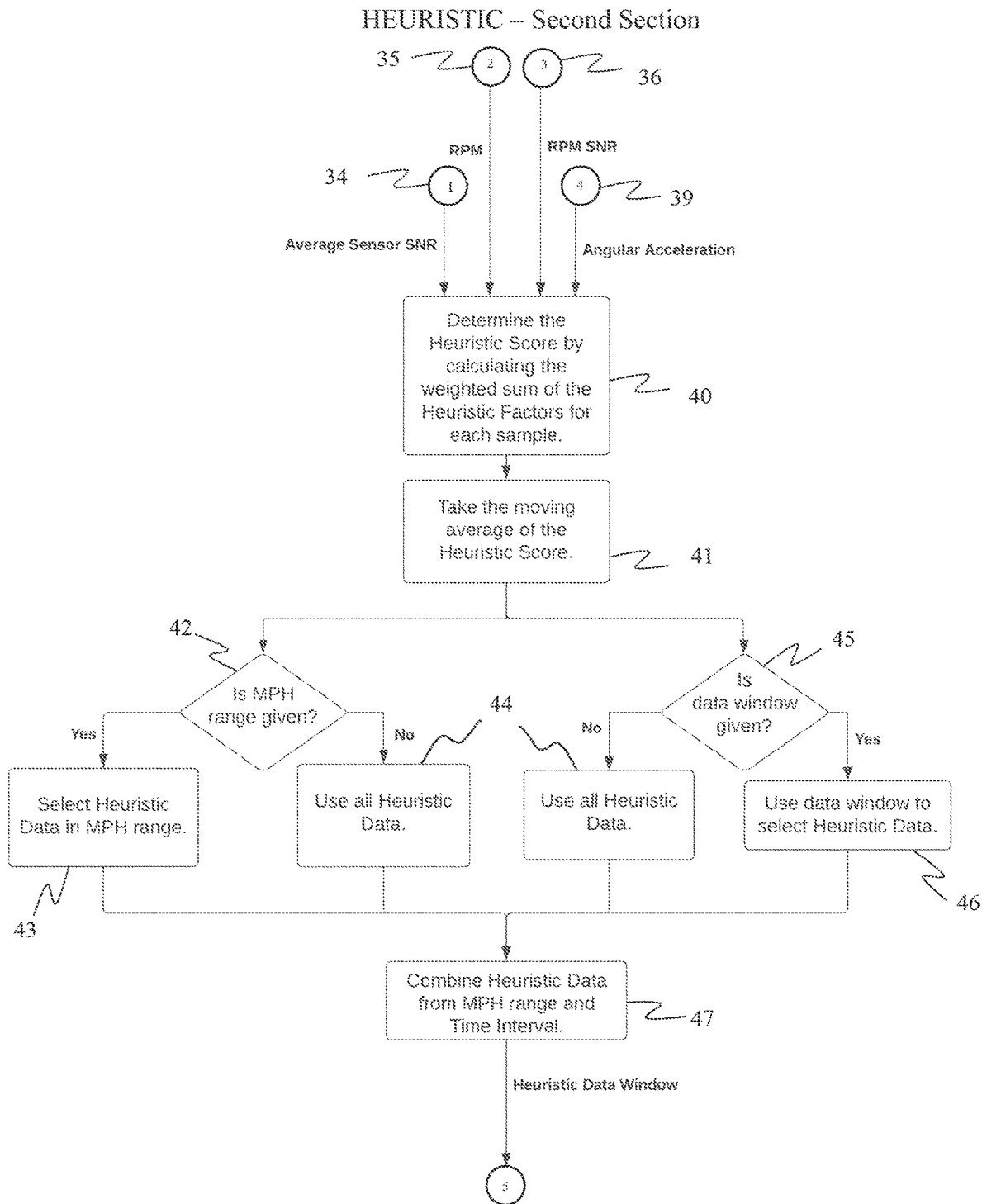
FIG. 5 is the second section of the Heuristic Flowchart, continued from FIG. 4. This shows the process followed in determining the Heuristic Score and Heuristic Data Window of each section of data.

Using the Heuristic Factors in the above list, the Heuristic Data Window can now be calculated. One embodiment of this process is shown in the flowchart of FIG. 5. The steps and outcomes of this flowchart are as follows:

Block 40: Compute the weighted sum of the Heuristic Factors for each sample. This weighted sum will be referred to as the Heuristic Score. The Heuristic Score is used to determine the section of the data that will be used in the analysis, the Heuristic Interval. An example of possible factors and their weights are as follows:

Average Sensor SNR 10
Angular Velocity 0
RPM SNR 0
Angular Acceleration −30

The weight for the Angular Acceleration is negative to decrease the score of any data that has any acceleration.

An example of determining a Heuristic Score would be a data point with an SNR of 5 and an angular acceleration of 1, which would have a total score of:

$$5*10+1*(-30)=20 \text{(Heuristic Score)}$$

The Heuristic Score is calculated for each data point in the signal.

Block 41: Take the moving average of the Heuristic Scores. The window size of the moving average is determined before analysis. This averaged Heuristic Score is called the Heuristic Data.

Block 42: Is MPH range given? In one preferred embodiment the MPH range will be entered as a preset based upon information provided as to what speed a quality-of-the-ride issue has been detected.

If "yes" to Block 42, then:
Block 43: Select Heuristic Data in the MPH range. The velocity of the vehicle at each data point can be determined. The Heuristic Data for all data points with a velocity that lies within the preset or predetermined MPH range will be analyzed. This will eliminate any data that was collected when the vehicle was not at the preset or predetermined speed.

If "no" to Block 42, then:
Block 44: Use all Heuristic Data.

Block 45: Is data window given? The data window refers to a Time Interval. The Time Interval refers to a specific start and end time relative to the entire data set. The Time Interval limits the selection of Heuristic Data to be used allowing the user to isolate desired section of the data. For example, if a pothole was hit during the data collection at a known time, say 10 seconds into the collection, then a Time Interval may be given starting at 15 seconds and ending at 30 seconds to eliminate known artifacts not resulting from vehicular vibrations.

If "yes" to Block 45, then:
Block 46: Use the data window to select Heuristic Data.
If "no" to Block 45, then:
Block 44: Use all Heuristic Data.

Block 47: Combine Heuristic Data from MPH range and Time Interval. The outcomes of both the MPH Range from Block 42 and the Time Interval from Block 45 are combined to create what is herein termed the Heuristic Data Window.

Figure 6:
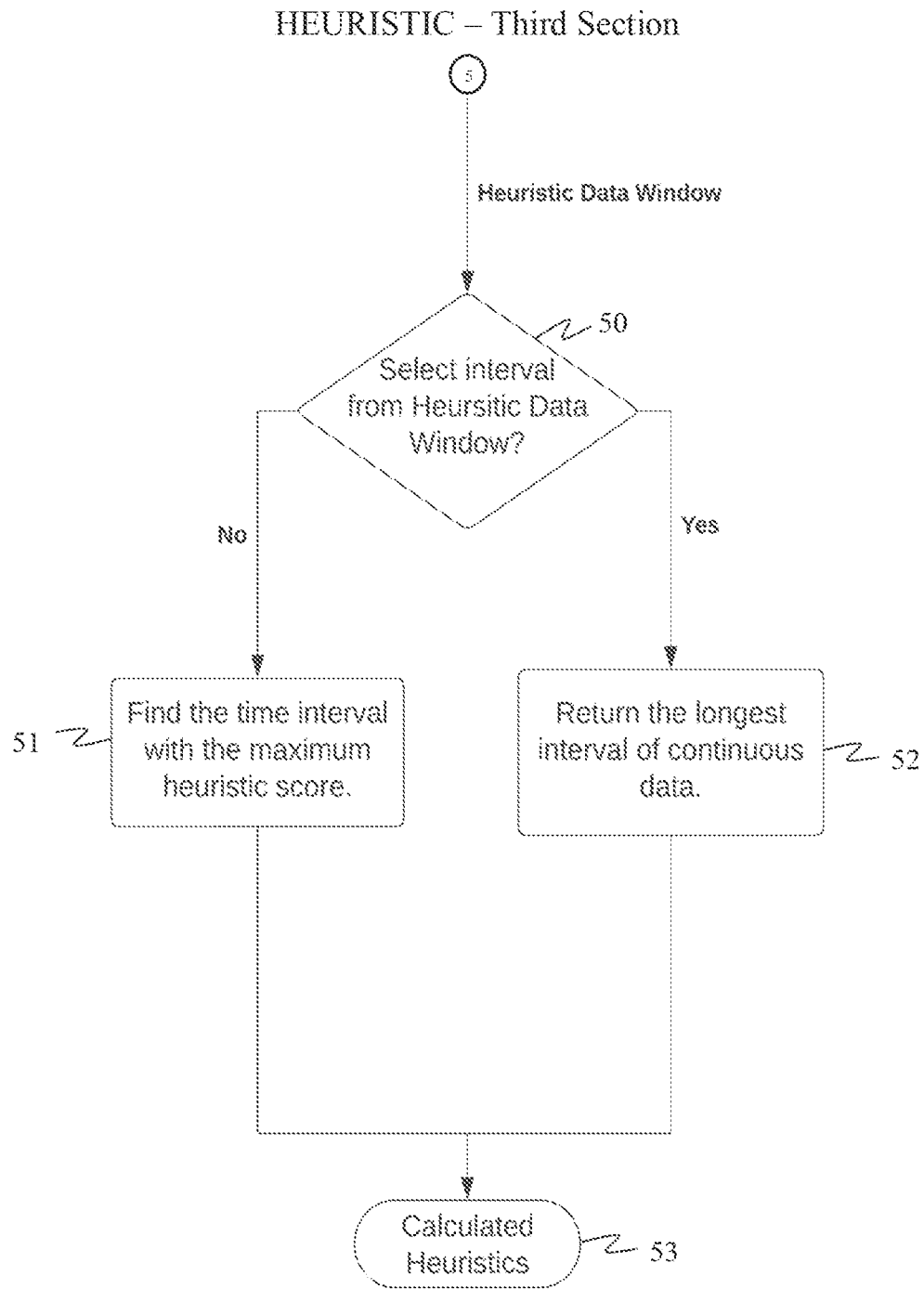
FIG. 6 is the third section of the Heuristic flowchart, continued from FIG. 5. This shows the process followed in selecting the interval which has the highest heuristic score.

Now that the Heuristic Data Window that is to be used is known, the Heuristic Interval can be selected. One embodiment for this process is shown in the flowchart of FIG. 6. The steps and outcomes are as follows:

Block 50: Select interval from Heuristic Data Window?
If "no" to Block 50, then:
Block 51: Find the time interval with the maximum Heuristic Score. The maximum Heuristic Interval is determined by the moving average found in Block 41.

If "yes" to Block 50, then:
Block 52: Return the longest interval of continuous data. In order get the best analysis, only a certain number of consecutive outliers—for example data points with acceleration above a threshold—are allowed before the interval can be considered for analysis.

Figure 3:
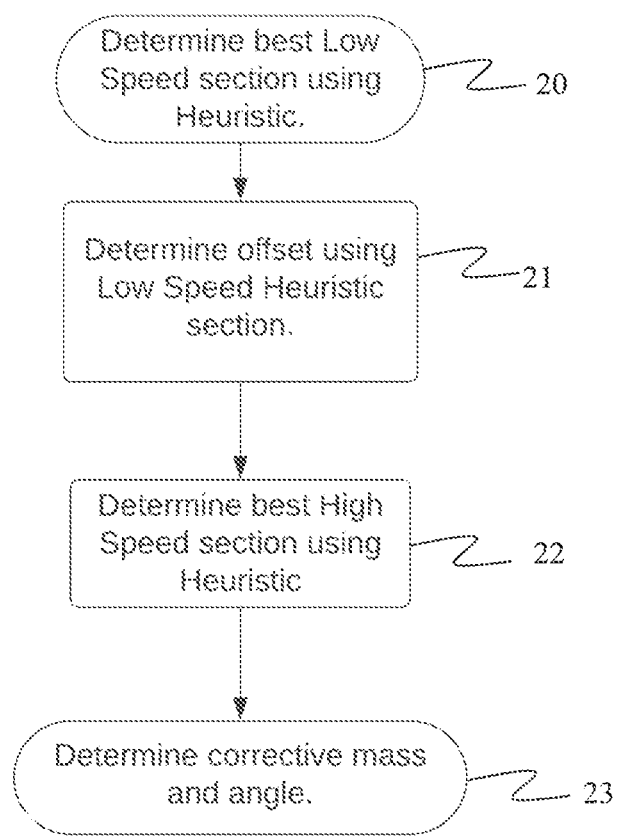
FIG. 3 is a flowchart of a simplistic Overview of the method used to determine the corrective mass and corrective angle.
Figure 4:
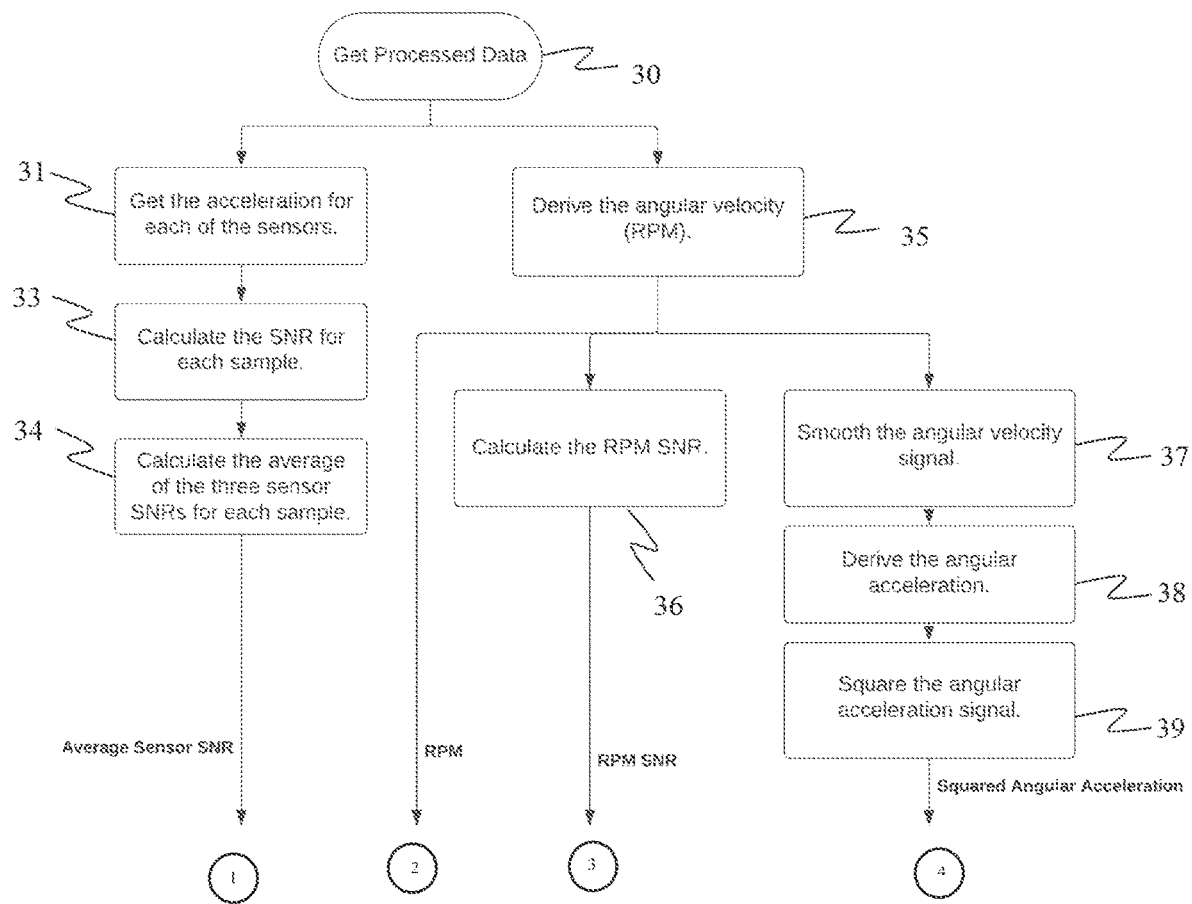
FIG. 4 is the first section of the Heuristic flowchart. This section shows the process followed when determining the Heuristic Factors which are Average Sensor SNR, RPM, RPM SNR, and Squared Angular Acceleration.

With this, the Heuristic has been used to calculate or determine the best Low-Speed in Block 20 of FIG. 3.

Figure 1B:
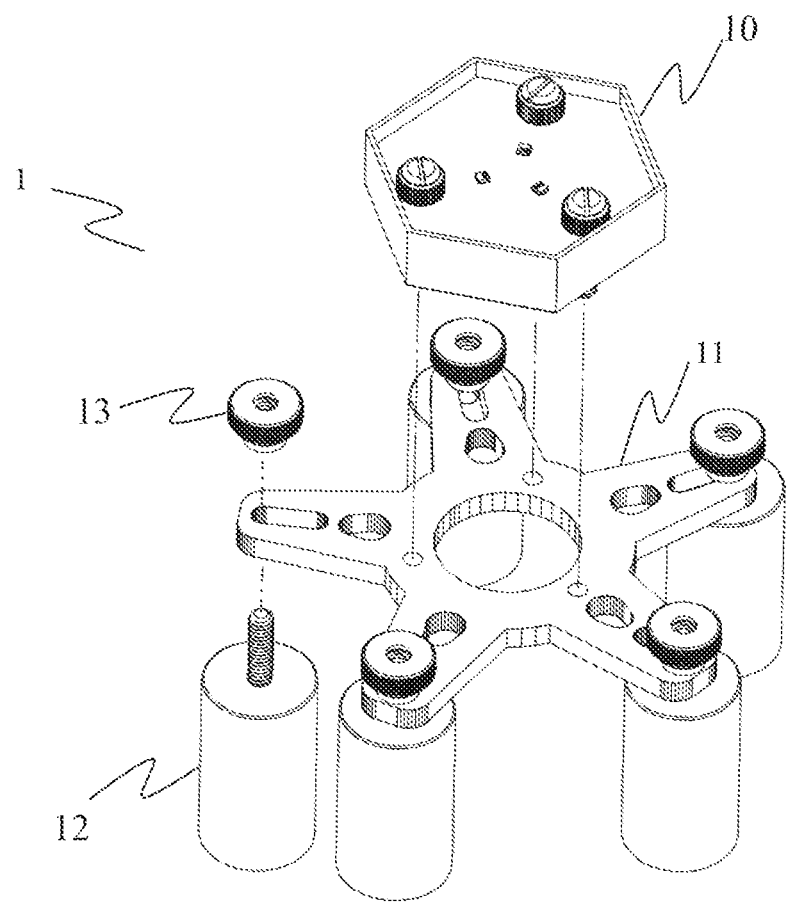
FIG. 1B is an exploded view of the embodiment of the device shown in FIG. 1A which shows the sensing module, the platen, and one cup lowered beneath the platen.
Figure 11:
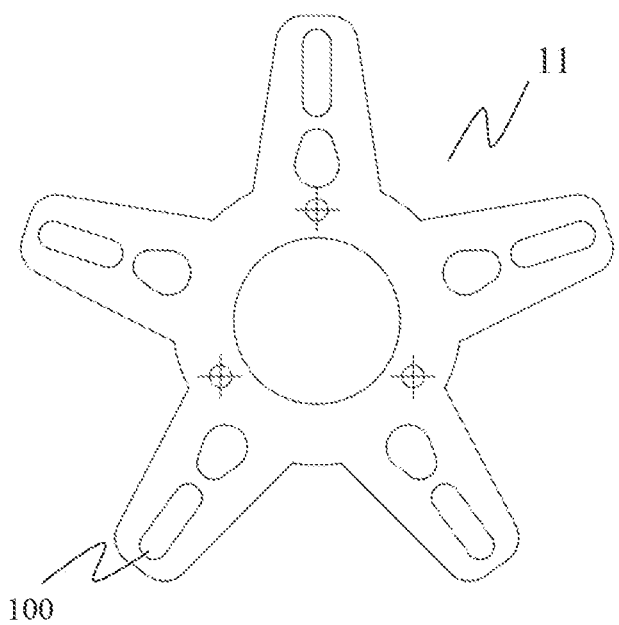
FIG. 11 is a top view of one example embodiment of the platen to show the mounting holes and the cup slots for a 5-lug wheel assembly.

FIG. 3 Block 21 Example Method: Determine offset using Low-Speed Heuristic section. The offset is the difference between the tire/wheel bearing center and the device center derived at Low-Speed because most tire and wheel anomalies that occur at high speeds are not apparent at lower speeds. Once the device offset has been determined, any measured off-center deviation of the rotational High-Speed data can be used to identify an imbalance, radial force variation, or eccentricity or other type of problem. There are a variety of factors that may lead to a small variation between the device center and the tire/wheel bearing center. Even if each factor only contributes a small variation, the combined variation could falsely indicate a large vibrational issue due to the uncorrected use of the device center to locate the vibration. Some of the reasons the device center would not line up with the bearing center include the following:

The cups 12 in FIG. 1B shift in their corresponding slots 100 on the platen 11. The slots 100 on the platen 11 are more clearly shown in FIG. 11.

Figure 12:
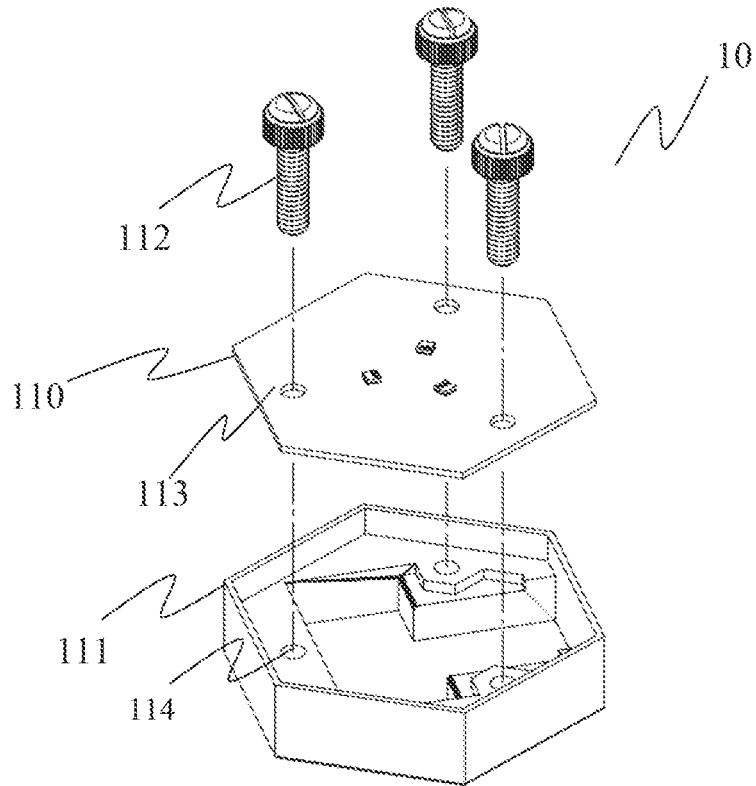
FIG. 12 is an exploded view of one embodiment of the module which includes the enclosure, the printed circuit board, the three sensors located on the printed circuit board, the printed circuit board mounting holes, the enclosure mounting holes, and the mounting hardware bolts.

The PCB 110 shifts or is slightly offset in the enclosure 111, as shown in one embodiment in FIG. 12.

The Mounting bolts 112 shift or are not perfectly centered in their corresponding PCB mounting holes 113 and Enclosure mounting holes 114, as shown in one embodiment in FIG. 12.

Figure 13:
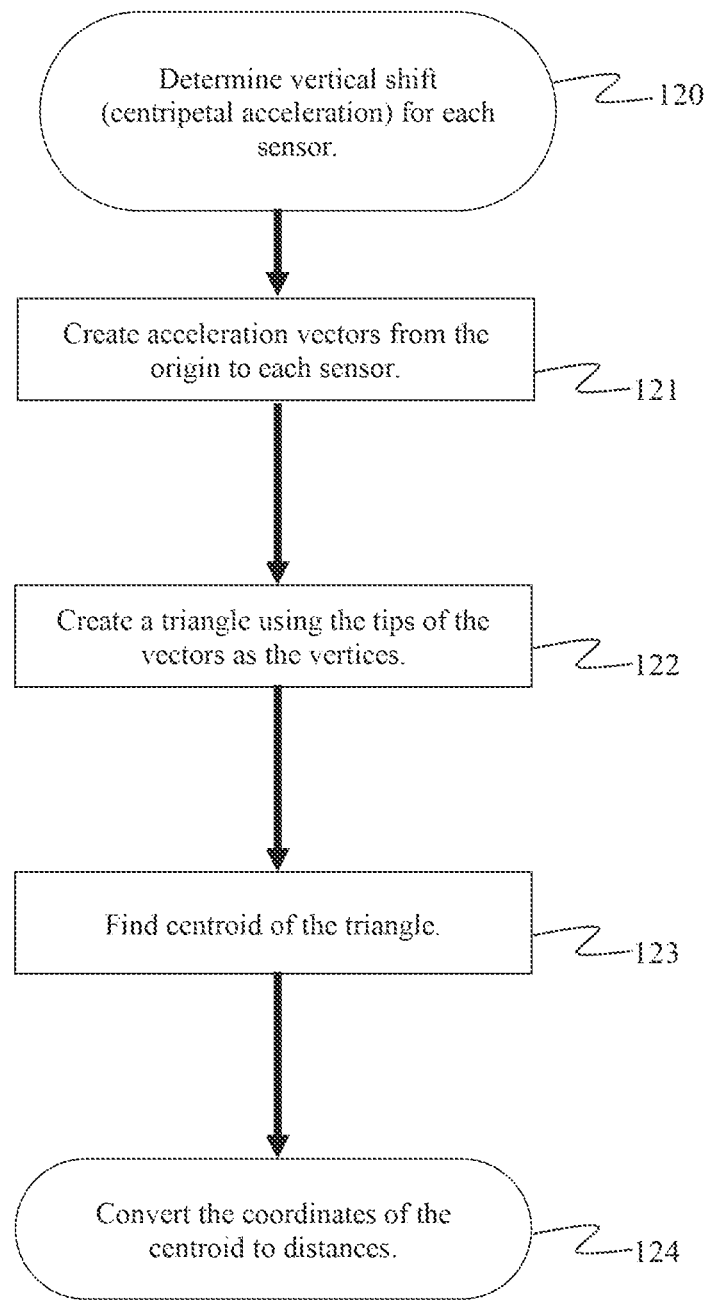
FIG. 13 is a flowchart of the process followed (Triangle Method) for determining the coordinates of the imbalance mass.
Figure 14:
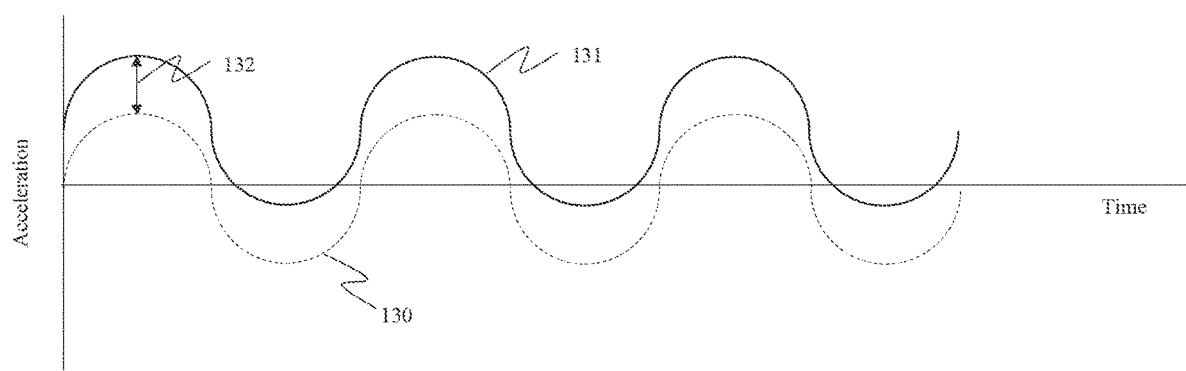
FIG. 14 is an example of how the signal collected by an IMU is shifted in the positive direction due to its centripetal acceleration when it is attached to a wheel assembly in motion.

One preferred embodiment in the process for determining the offset is termed herein as the "Triangle Method." The Triangle Method is represented in the flowchart of FIG. 13. The steps and outcomes of the flowchart are as follows:

Block 120: Determine the vertical shift (centripetal acceleration) for each sensor. The term "vertical shift" refers to a movement of the signal in the positive y-direction. In FIG. 14 the dotted line 130 represents the original sinusoidal signal which is created by gravity and a rotating sensor when the sensor is located precisely in the center of the axis of rotation. When the sensor is not precisely in the center of the axis of rotation, it moves in a circular path and experiences an additional centripetal acceleration which causes the signal to shift in the positive direction by an amount equal to the centripetal acceleration. The solid line 131 in FIG. 14 represents this shifted signal. The vertical shift is represented by 132. The vertical shift in the signal is caused by the centripetal acceleration of the sensor. The vertical shift is determined by taking the average of the entire time span that is being evaluated.

Figure 15A:
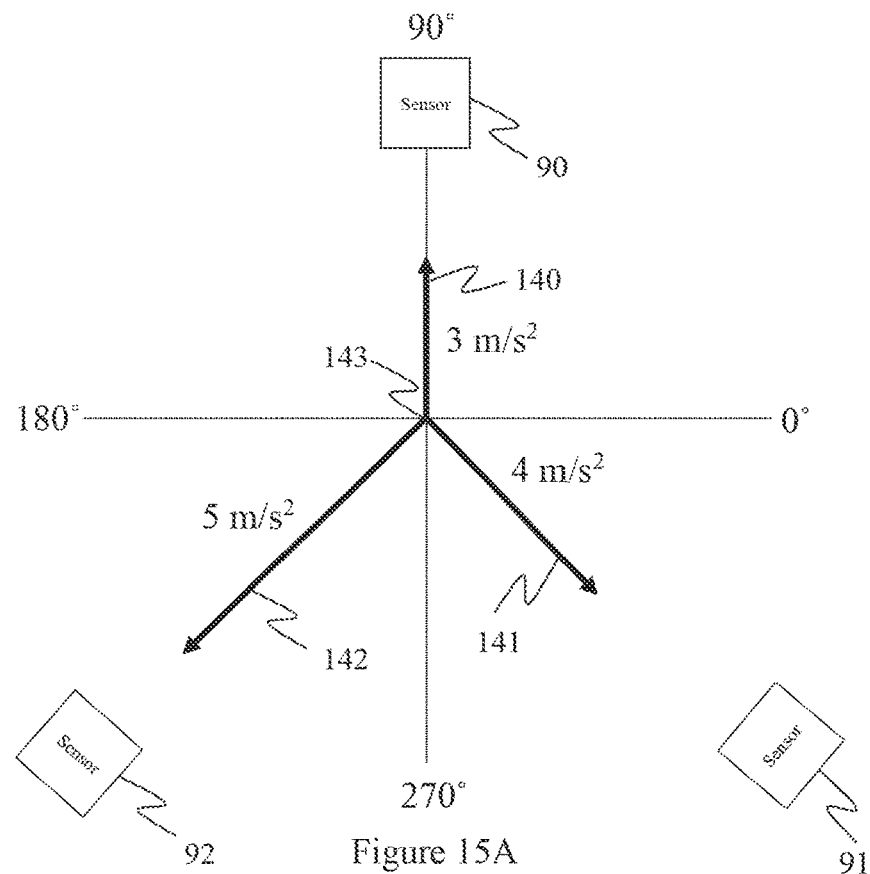
FIG. 15A is an example of how the acceleration vectors derived from the data are aligned using the Triangle Method.

Block 121: Create the acceleration vectors from the origin to each sensor. This process is shown in FIG. 15A. Align a vector from the origin 143 toward each sensor with a magnitude that is equal to the magnitude of the vertical shift of that sensor. An example where the centripetal acceleration of Sensor 90 is 3 m/s$^2$, shown as vector 140, Sensor 91 is 4 m/s$^2$, shown as vector 141, and Sensor 92 is 5 m/s$^2$, shown as vector 142, is shown in FIG. 15A.

Figure 15B:
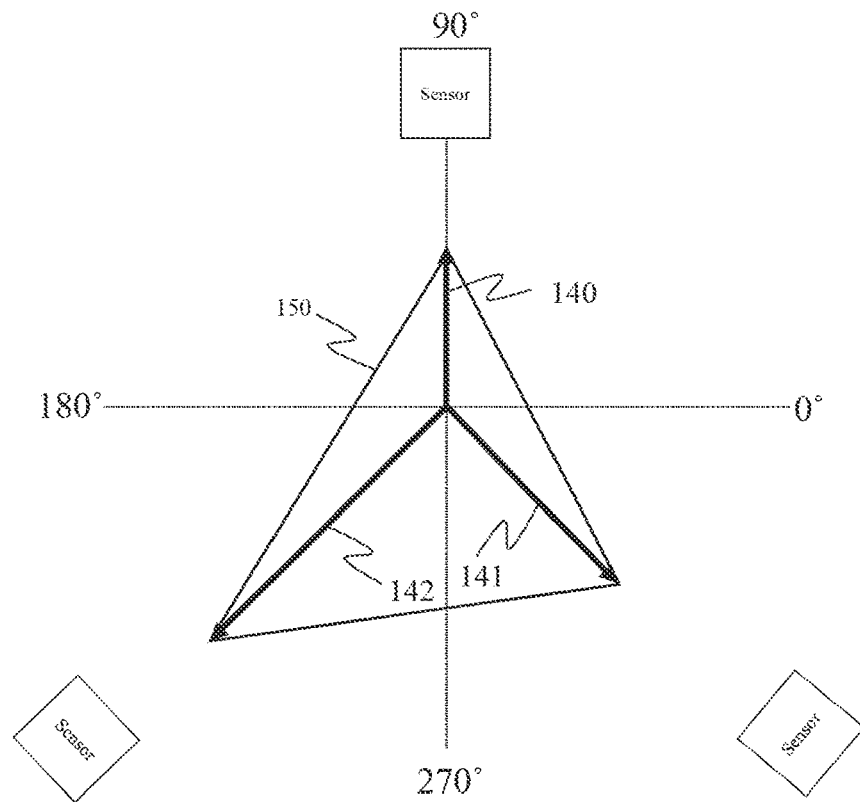
FIG. 15B shows the triangle that is drawn from the acceleration vectors.

Block 122: Create a triangle using the tips of the vectors as the vertices. An example of this is shown in FIG. 15B with the derived triangle shown as 150.

Figure 16A:
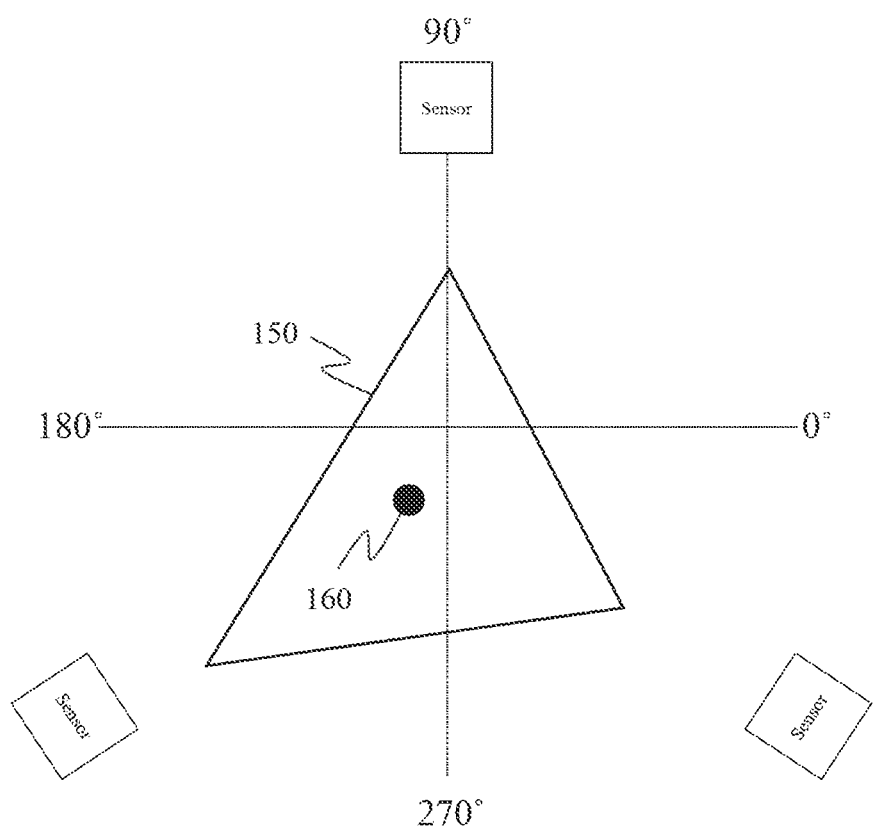
FIG. 16A shows the derived centroid of a triangle from the sensor data.

Block 123: Find the centroid of the triangle. This is done by taking the average of the coordinates for vertices 140, 141, and 142 of the triangle 150 in FIG. 15B. The centroid 160 is shown in FIG. 16A.

Block 124: Convert the coordinates of the centroid to distances. These coordinates are derived using acceleration vectors and therefore have acceleration values. Using the equation $a_c = \omega^2 r$, these values can be converted into distances using the average acceleration. The average angular velocity is determined by taking the average of the angular velocity 84 over the selected MPH range.

The above calculation is completed using data from the x-axis sensor and from the y-axis sensor. Each calculation produces a point identified by a coordinate pair. The coordinates found are offset and determine the location of the bearing center. The offset can be used for calibration in a High-Speed section. While the Low-Speed section is used to determine the offset, and thus calibrate and align the device to the wheel/hub assembly, the High-Speed section is used to determine the location and magnitude of vibrational anomalies in the wheel assembly.

Figure 16B:
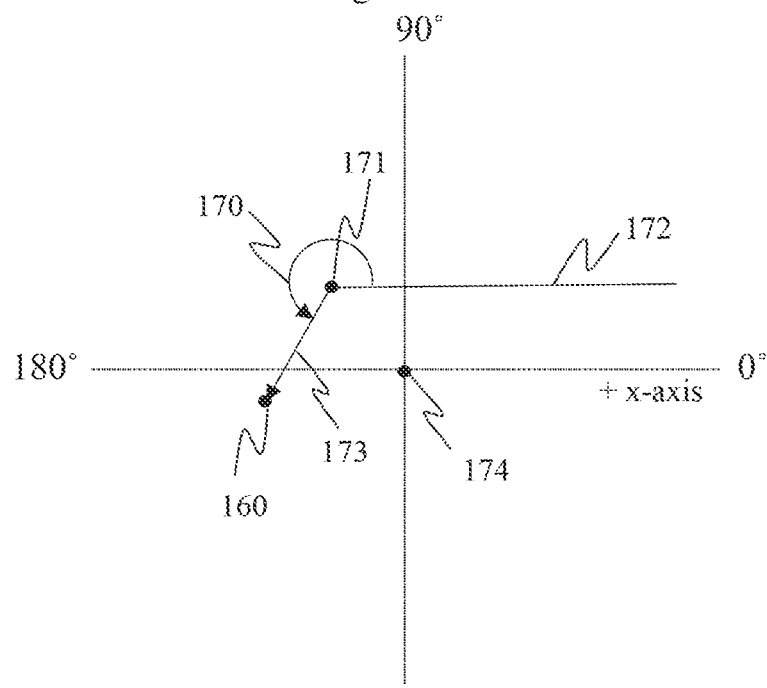
FIG. 16B shows how the corrective angle is derived.

FIG. 3. Block 22 Example Method: Find the best High-Speed section using the Heuristic. Follow the same steps that were used on the Low-Speed section from Blocks 30 to 39 in FIG. 4 and Blocks 40 to 47 in FIG. 5. Specific to the High-Speed section and due to the increased vibrations present at higher speeds, a time interval of data can be used to optimize results. Block is a "yes", so the desired time interval is applied over the Heuristic Data from the High-Speed section to determine the Heuristic Interval which will be used in the following steps. Block 23: Determine the corrective mass and angle. The corrective angle is determined by applying the Triangle Method, described above, on the data from the interval determined from the Heuristic applied to the High-Speed Block 47. This application of the Triangle Method determines the coordinates of the centroid 160, the anomaly-altered center of mass of the tire/wheel assembly, of triangle 150 in FIG. 16A. The angular location of centroid 160 relative to the offset 171 in FIG. 16B, determined from the Low-Speed section, is used to determine the angular position of the corrective mass. Angle 170 in FIG. 16B is measured from line 172, which is parallel to the x-axis of the device and passes through the offset 171 to a vector 173 which goes from the offset 171 to the centroid 160. This angle is the angle from the bearing center to the vibrational anomaly. The corrective angle is opposite angle 170.

Figure 17:
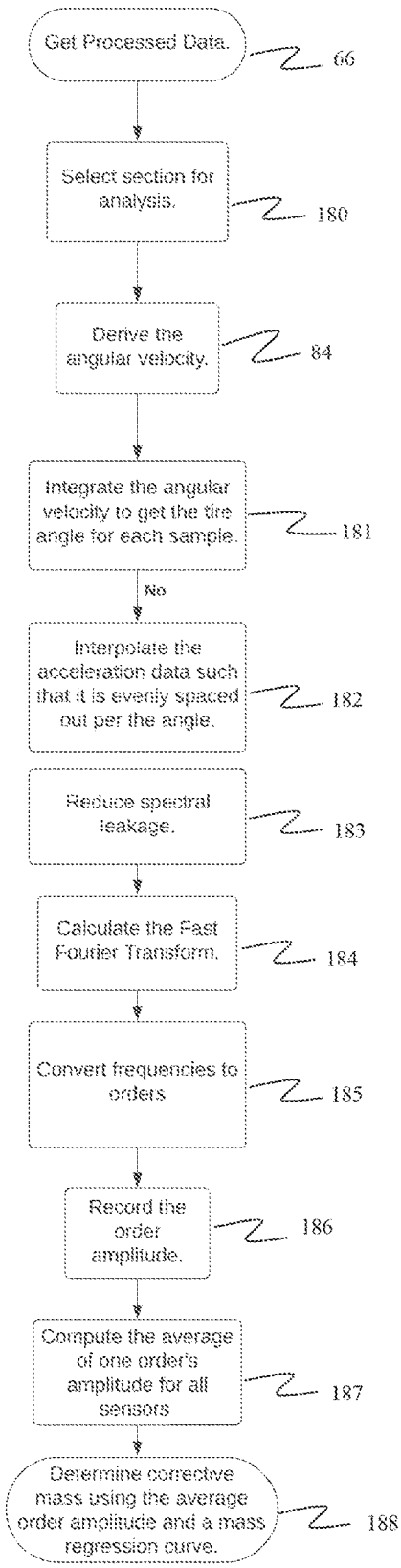
FIG. 17 is a flowchart of the applied order analysis process when determining the imbalance mass.

One embodiment for determining the magnitude of the corrective mass is done by a predictive model. In one example, the predictive model is an order regression (e.g., a second order regression) which is shown in the flowchart in FIG. 17. Stated another way, FIG. 17 shows a process wherein acceleration data is applied to a predictive model (here, an order regression) to determine the magnitude of the mass. The scope of the present invention is not limited to using order regression, but includes other types of predictive models, such as classification models or neural networks.

The steps and outcomes are as follows:

Block 66: Get Processed Data. One preferred embodiment for retrieving Processed Data 66, which is described above, is shown in FIG. 7.

Block 180: Select section for analysis. This section is typically the section of data where there is a desired comfort of ride issue or section of data with vibrational anomaly to analyze.

Block 84: Derive the angular velocity. One method is described previously and is shown in FIG. 9.

Block 181: Integrate the angular velocity to get the tire angle for each sample.

Block 182: Interpolate the acceleration data such that it is evenly spaced out per tire angle.

Block 183: Reduce Spectral Leakage. One preferred embodiment uses resampling methods.

Block 184: Calculate the Fast Fourier Transform.

Block 185: Convert frequencies to orders. This gives the order amplitude.

Block 186: Record the order amplitude for that sensor. Repeat Blocks 180 through 187 for the rest of the sensors.

Block 187: Compute the average of one order's amplitude for all sensors.

Block 188: Determine the corrective mass using the average order amplitude and a mass regression curve. The mass regression is a relationship between those factors that are most influential toward the vibration of the wheel assembly. Those factors may include tire mass, rim radius, weight over the axle, and other factors.

The mass regression provides the corrective mass from Block 188 and, with the location of the corrective mass, opposite angle 170, provides the solution for which corrective mass to apply and in what angular location, relative to the center of Device or wheel assembly, to correct for wheel/hub assembly vibrations.

Figure 2:
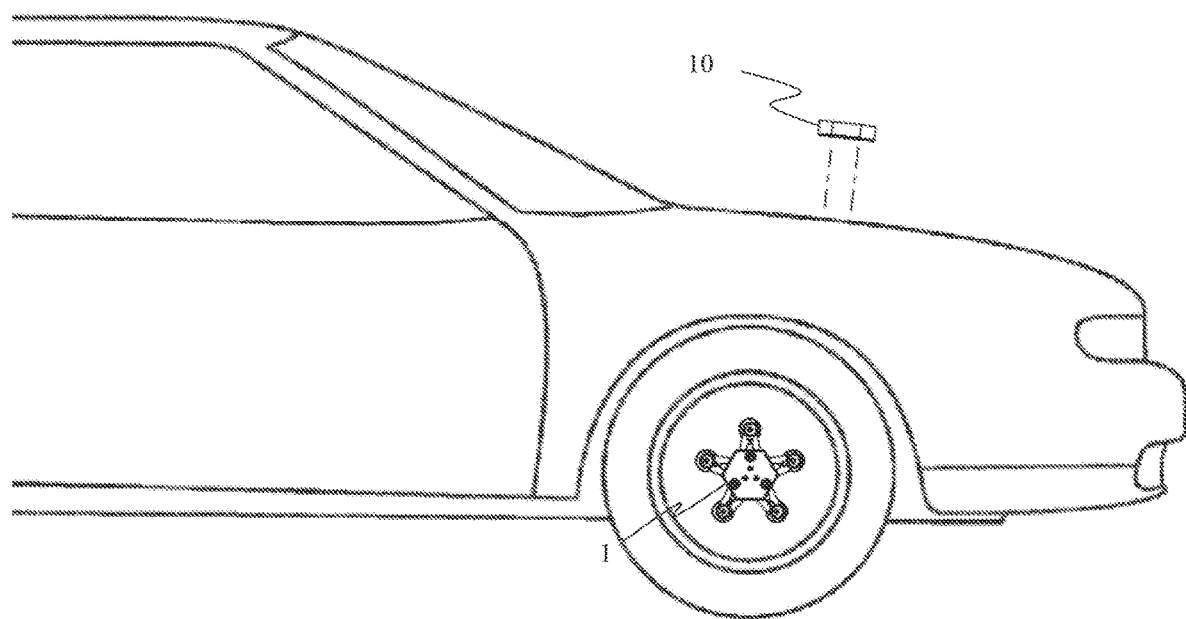
FIG. 2 is one example embodiment of using multiple devices, one device attached to the wheel and another device attached to the body of the vehicle.
Figure 18:
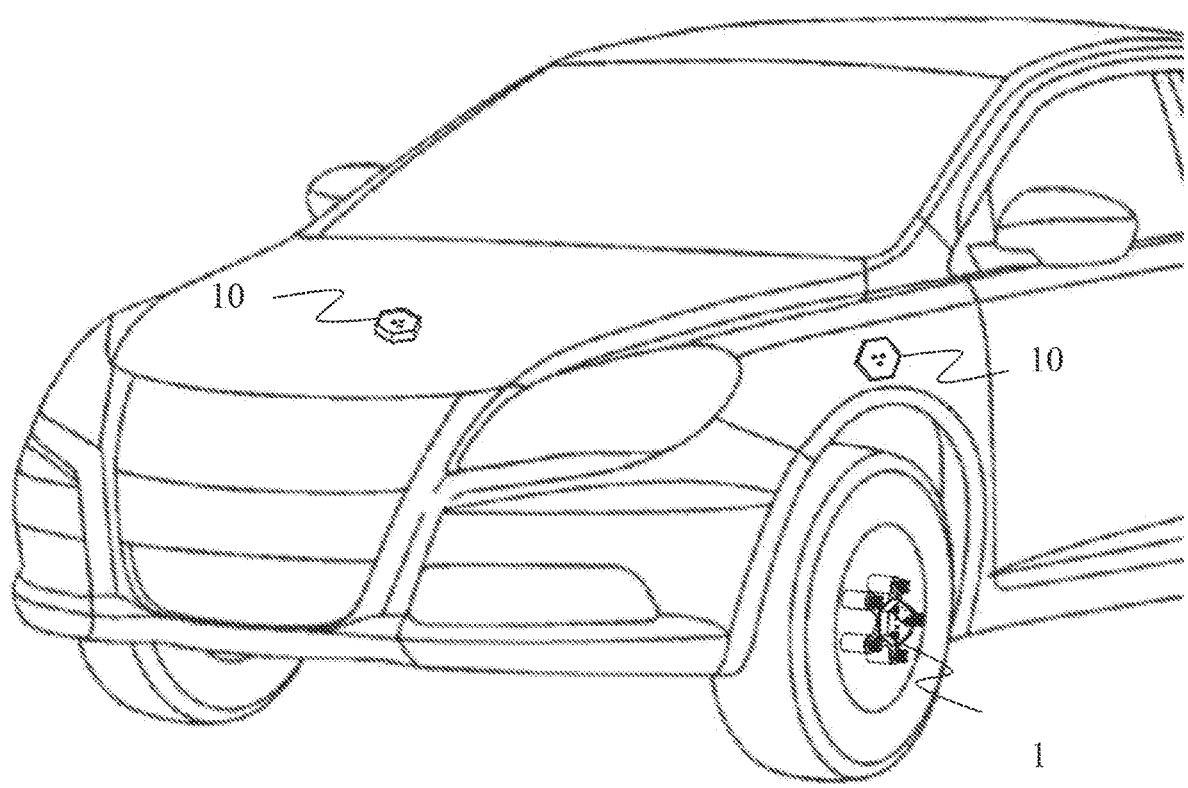
FIG. 18 shows one example embodiment of multiple possible locations for the attachment of the device to the body of the vehicle.
Figure 19:
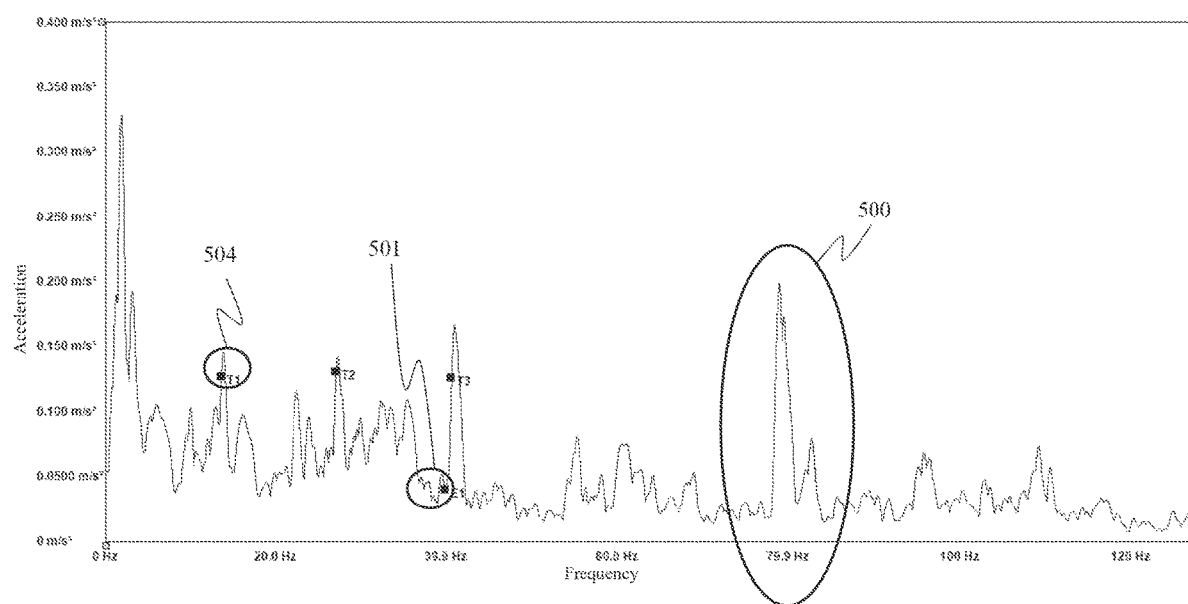
FIG. 19 shows example data that was collected by an accelerometer that was placed on the body of the car close to the tire that was being analyzed.

In another preferred embodiment, vibrations not limited to the wheel/hub assembly can be further analyzed using one or more devices being mounted in a removably attached manner on other locations of the vehicle. One such embodiment with device 10 attached to the hood is shown in FIG. 2. The device 10 can be one or more sensors, such as IMU's, with or without some sort of remote control, and could be affixed via a magnet, adhesive, or with any type of mechanical adapter. Locating it on the quarter panel as shown in FIG. 18 or elsewhere on the vehicle provides an unlimited number of locations for one or more devices 10 to be placed. This collected data can be used to determine the location of vibration caused by the wheel assembly or other vibration generated elsewhere in the vehicle, included but not limited to, the transmission, the differential, the engine, or any other vibrational source. Order Analysis, similar to how PICO Technology software analyzes the data from their device, is one preferred method by which the data can be analyzed to determine the type and source of vibration. For example, FIG. 19 is a graph showing the order analysis of vibrational data collected using the device and software from PICO Technology. The data was collected from an accelerometer that was placed inside the trunk of the vehicle (not shown) in a location that was as close to the tire being analyzed as possible. The vehicle was driven at a constant speed of 60 mph for this data collection. The diagrammed oval surrounding peak 500, shows a strong signal at 79.9 Hz. The diagrammed circles surrounding graph location 501 and further identified by E1 indicate the frequency at which the engine was rotating as 39.9 Hz. The strong signal at 79.9 Hz is an indication that there is an issue related to either the engine or the drivetrain. Any combination of one or more device 1 and one or more device 10 could be used to accurately determine the type and location of virtually any type of vibration occurring within or on a vehicle, whether it is stationary or in motion.

An example follows in which data from both sensors, device 1 and device 10, are used to identify the source of a vibrational anomaly. In FIG. 19, the peak identified by circle 504 shows vibrations which occur at the same frequency as the rotation of the tire/wheel assembly. This vibrational data was collected by device 10. If analysis of the acceleration data collected by Device 1 determines that there is no vibrational anomaly caused by the tire/wheel assembly, then the peak identified by circle 504 would indicate that the source of the vibrational anomaly may be in the drivetrain or the engine. For example, if the mass regression analysis from FIG. 17 from data for each wheel returns negligible corrective mass, then the vibration indicated by the peak 504 does not originate from the tire/wheel assembly and it may originate from the engine and/or drivetrain.

PICO Technology (www.picoauto.com and www.pico-tech.com) is headquartered in Cambridgeshire, United Kingdom, and markets products for Noise, Vibration and Harshness (NVH) testing, including PicoDiagnostics NVH kits. These commercially available kits may be used for collection and analysis of the vibrational data discussed above. However, other commercial products are within the scope of the present invention for collection and analysis of the vibrational data.

It will be appreciated by those skilled in the art that changes could be made to the embodiments described above without departing from the broad inventive concept thereof. It is understood, therefore, that this invention is not limited to the embodiments disclosed, but it is intended to cover modifications within the spirit and scope of the present invention.

What is claimed is:

1. A method for determining a location to place a mass on a wheel assembly, the method comprising:
   (a) collecting a first set of acceleration data from a plurality of inertial measurement units (IMU's) that are mounted to a removably attachable object that is attached to a wheel of the vehicle in a manner that inhibits the object from coming off of the vehicle when the vehicle is in motion,
      wherein the first set of acceleration data is collected while operating the vehicle at a first speed;
   (b) using the first set of acceleration data to determine an offset between a center of the object and a bearing center of the wheel assembly;
   (c) collecting a second set of acceleration data from the plurality of inertial measurement units (IMU's),
      wherein the second set of acceleration data is collected while operating the vehicle at second speed that is greater than the first speed; and
   (d) using the second set of acceleration data and the offset determined from the first set of acceleration data to determine the location to place the mass on a wheel assembly with respect to the bearing center of the wheel assembly.

2. The method of claim 1 wherein the second speed is between 1.5 and 3.0 times the first speed.

3. The method of claim 1 wherein acceleration test data is collected while operating the vehicle, and wherein the first set of acceleration data is heuristically selected from a subset of the acceleration test data.

4. The method of claim 1 wherein acceleration test data is collected while operating the vehicle, and wherein the second set of acceleration data is heuristically selected from a subset of the acceleration test data.

* * * * *